Patented Oct. 4, 1949

2,483,671

UNITED STATES PATENT OFFICE 2,483,671

AMINOALKYL BENZHYDRYL THIOETHERS AND THEIR PREPARATION

George Rieveschl, Jr., Grosse Pointe Woods, Mich., assignor to Parke, Davis & Company, Detroit, Mich., a corporation of Michigan No Drawing. Application June 2, 1947, Serial No. 751,984

10 Claims. (Cl. 260—247)

This invention relates to certain basically substituted thioethers and to methods for obtaining the same. This application is a continuation-in-part of my copending application Serial No. 531,639, filed April 18, 1944, now Patent No. 2,421,714 issued June 3, 1947 and relates to ω-N-substituted aminoalkyl benzhydryl thioethers, the free bases of which have the formula,

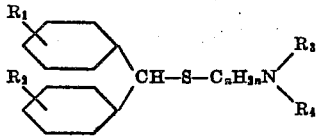

where $n$ is an integer of 2 to 6 inclusive, $R_1$ and $R_2$ are the same or different and represent hydrogen, halogen, a lower alkyl radical or a lower alkoxy radical, $R_3$ is an alkyl radical containing not more than six carbon atoms and $R_4$ is hydrogen, an alkyl radical containing not more than six carbon atoms or where taken with $R_3$ and —N< a saturated heterocycle such as piperidine, morpholine, thiomorpholine and pyrrolidine. A copending application Ser. No. 688,427, filed August 5, 1946 also as a continuation-in-part of Ser. No. 531,639, discloses and claims certain of the thioethers herein disclosed.

The compounds of this invention may be obtained as the free base having the formula given above or they may be obtained in the form of their acid addition salts with organic and inorganic acids. Some typical examples of these salts are the hydrobromide, hydrochloride, phosphate, citrate, sulfate, oxalate, tartrate, salicylate, benzoate and acetate salts.

I have found that compounds of the above general formula may be obtained in high yields by the reaction of an alkali metal salt of benzhydryl mercaptan of the formula,

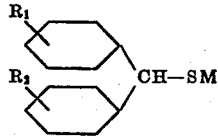

with an ω-aminoalkyl halide of the formula,

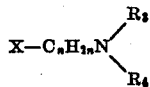

in an organic solvent or a water-organic solvent mixture. Some of the solvents which have proved satisfactory for the purposes of this reaction are methanol, water-methanol mixture, dilute ethanol, absolute ethanol, isopropanol, aqueous dioxane, benzene, toluene, terpentine, pyridine, di-n-butyl ether and xylene. These new thioethers may also be prepared by the reaction of a benzhydryl halide of the formula,

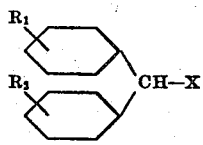

with an alkali metal salt of an ω-aminoalkyl mercaptan of the formula,

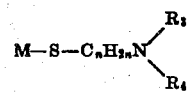

under the same conditions used to bring about the reaction between an alkali metal salt of benzhydryl mercaptan and an ω-aminoalkyl halide. In the above formulae $R_1$, $R_2$, $R_3$, $R_4$, and $n$ have the same significance as given above, M is an alkali metal and X is a chlorine, bromine or iodine atom.

The compounds of the present invention are useful as antihistamine and antispasmodic agents as well as intermediates in the synthesis of other valuable organic compounds.

The invention is illustrated by the following examples.

*Example 1.—β-Dimethylaminoethyl benzhydryl thioether*

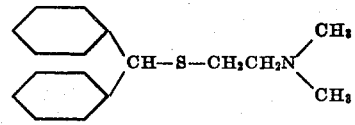

32.3 g. of S-benzhydryl isothiourea hydrobromide is dissolved in 50 cc. of ethanol and 15 g. of sodium hydroxide in 20 cc. of water added to the solution with stirring. The solution of the sodium salt of benzhydryl mercaptan thus obtained is warmed for a few minutes and then treated with a solution of 23.3 g. of β-dimethylaminoethyl bromide hydrobromide in 50 cc. of alcohol. The mixture is heated under reflux for one hour, cooled and diluted with water. The solution is extracted with ether, the ether extracts washed with water and dried. On adding an excess of alcoholic hydrogen chloride to the ether solution of the base the hydrochloride salt of β-dimethylaminoethyl benzhydryl thioether is obtained as a white solid which may be purified by recrystallization from isopropanol ethyl acetate mixture; M. P. 181–3° C.

Example 2.—γ-Dimethylaminopropyl benzhydryl thioether

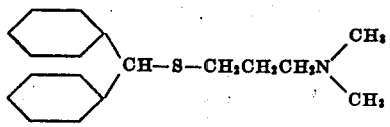

20 g. of benzhydryl mercaptan is dissolved in 200 cc. of 50% methanol containing 8 g. of sodium hydroxide and the resulting solution treated with 16.5 g. of γ-dimethylaminopropyl chloride hydrochloride. The mixture is heated under reflux for three hours, diluted with water and extracted with ether. The ether solution is extracted with 5% sodium hydroxide, washed with water and then extracted with dilute hydrochloric acid. The acidic extracts are made alkaline in the cold with 10% sodium hydroxide solution, the free base extracted with ether and the ether extracts dried. The dry ether solution is treated with an excess of dry hydrogen chloride and the white hydrochloride of γ-dimethylaminopropyl benzhydryl thioether which separates, collected and purified by recrystallization from isopropanol-ether mixture.

Example 3.—γ-1-piperidylpropyl benzhydryl thioether

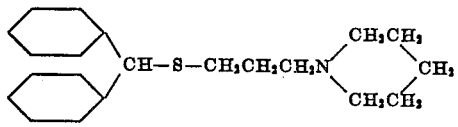

20. g. of benzhydryl mercaptan is added to 200 cc. of 70% ethanol containing 11.5 g. of potassium hydroxide. After all the mercaptan has dissolved 28.7 g. of γ-1-piperidylpropyl bromide hydrobromide is added in small portions with stirring and the resulting mixture refluxed for three hours. Most of the alcohol is removed by distillation, the residue diluted with water and extracted with ether. The ether extract is washed with water, dried and treated with an excess of dry gaseous hydrogen bromide. The hydrobromide salt of γ-1-piperidylpropyl benzhydryl thioether which separates as a white fluffy solid is collected and purified by recrystallization from isopropanol-ether mixture.

By substituting an equivalent amount of γ-(3-methyl-1-piperidyl)-propyl bromide hydrobromide for the piperidyl alkyl halide in the above procedure one obtains γ-(3-methyl-1-piperidyl)-propyl benzhydryl thioether hydrobromide.

Example 4.—β-Di-n-propylaminoethyl-4, 4'-dimethyl benzhydryl thioether

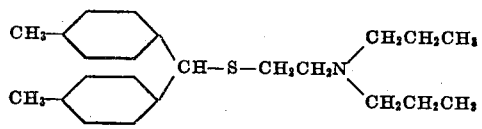

28.9 g. of β-di-n-propylaminoethyl bromide hydrobromide is added to a solution of 22.8 g. of 4, 4'-dimethyl benzhydryl mercaptan in 150 cc. of isopropanol containing 11.3 g. of potassium hydroxide and the resulting mixture warmed on a steam bath for two hours. Most of the solvent is distilled off under reduced pressure, the residue diluted with water and the mixture extracted with ether. The ether extracts are washed with water, dried and the either distilled to obtain the crude free base of β-di-n-propylaminoethyl-4, 4'-dimethyl benzhydryl thioether.

The free base may be converted to its acid oxalate addition salt by adding it to a warm solution of isopropanol containing an equivalent amount of oxalic acid dihydrate. The salt which separates from the solution is collected by filtration and purified by recrystallization from isopropanol.

The citrate salt may be prepared by dissolving the crude free base in ether and adding a saturated ether solution of citric acid. The citrate which separates as a fine powder is collected and purified by repeated washing with dry ether.

Example 5.—γ-Di-n-butylamino-β-methylpropyl benzhydryl thioether

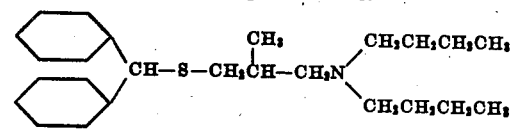

20 g. of benzhydryl mercaptan is dissolved in 200 cc. of 50% methanol containing 8 g. of sodium hydroxide and the resulting solution treated with 26 g. of γ-di-n-butylamino-β-methylpropyl chloride hydrochloride. The mixture is heated under reflux for three hours, diluted with water and extracted with ether. The ether solution is extracted with 5% sodium hydroxide, washed with water and then extracted with dilute hydrochloric acid. The acidic extracts are made alkaline in the cold with 10% sodium hydroxide solution, the free base extracted with ether and the ether extracts dried. The dry ether solution is treated with an excess of dry hydrogen chloride and the hydrochloride salt of γ-di-n-butylamino-β-methylpropyl benzhydryl thioether which separates from the solution, collected and purified by recrystallization from isopropanolether mixture.

Example 6.—ζ-4-morpholinylhexyl benzhydryl thioether

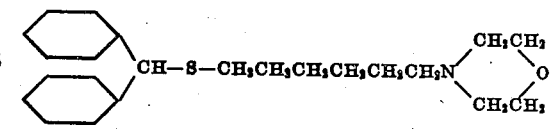

A solution containing 22.2 g. of the sodium salt of benzhydryl mercaptan and about 7 g. of free sodium hydroxide is prepared by adding a solution of 15 g. of sodium hydroxide in 30 cc. of water to a rapidly stirred solution of 32.3 g. of S-benzhydryl isothiourea hydrobromide in 100 cc. of ethanol. The solution is warmed for a few minutes and then 34.5 g. of ζ-4-morpholinylhexyl bromide hydrobromide in 100 cc. of alcohol added to the warm solution of the mercaptan salt. The mixture is refluxed for about two hours, cooled and diluted with water. The solution is extracted with ether, the ether extract washed with water and dried. The free base of the desired ζ-4-morpholinylhexyl benzhydryl thioether present in the ether solution is converted to the hydrochloride by treatment with an excess of alcoholic hydrogen chloride. The hydrochloride salt is collected, washed with ether and purified by recrystallization from isopropanol-ether mixture.

In a similar manner by substituting an equivalent amount of ζ-4-thiomorpholinylhexyl bromide hydrobromide for the ζ-4-morpholinylhexyl bromide hydrobromide used in the above procedure, one obtains ζ-4-thiomorpholinylhexyl benzhydryl thioether.

Example 7.—β-methylaminoethyl benzhydryl thioether

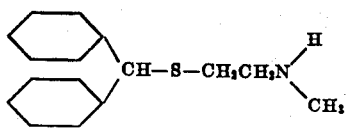

20 g. of benzhydryl mercaptan is added to 200 cc. of 70% ethanol containing 11.5 g. of potassium hydroxide. After all the mercaptan has dissolved 13.5 g. of β-methylaminoethyl chloride hydrochloride is added in small portions with stirring and the resulting mixture refluxed for three hours. Most of the alcohol is removed by distillation, the residue diluted with water and extracted with ether. The ether extract is washed with water, dried and treated with an excess of dry gaseous hydrogen bromide. The hydrobromide salt of the desired β-methylaminoethyl benzhydryl thioether is washed by decantation with dry ether and purified by crystallization from isopropanol-ether mixture.

By substituting an equivalent amount of β-ethylaminoethyl chloride hydrochloride for the β-methylaminoethyl chloride hydrochloride used in the above procedure one obtains β-ethylaminoethyl benzhydryl thioether.

These two compounds may also be prepared by the reaction of the corresponding potassium salt of the β-aminoethyl mercaptan with benzhydryl bromide.

Example 8.—β-dimethylamino-α-methylethyl benzhydryl thioether

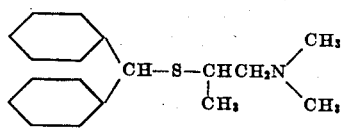

32.3 g. of S-benzhydryl isothiourea hydrobromide is dissolved in 50 cc. of ethanol and 15 g. of sodium hydroxide in 20 cc. of water added to the solution with stirring. The solution of the sodium salt of benzhydryl mercaptan thus obtained is warmed for a few minutes and then treated with a solution of 24.7 g. of β-dimethylamino-α-methylethyl bromide hydrobromide in 65 cc. of alcohol. The mixture is heated under reflux for about two hours, cooled and diluted with water. The solution is extracted with ether, the ether extracts washed with water and dried. On adding an excess of alcoholic hydrogen chloride to the ether solution of the base, the hydrochloride salt of β-dimethylamino-α-methylethyl benzhydryl thioether is obtained as a white solid which may be purified by recrystallization from isopropanol-ethyl acetate mixture.

Example 9.—δ-Diethylaminobutyl benzhydryl thioether

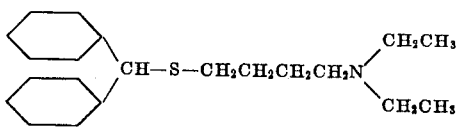

40 g. of sodium hydroxide in 70 cc. of water is added to a solution of 97 g. of S-benzhydryl isothiourea hydrobromide in 250 cc. of ethanol. The mixture is heated for about one-half hour and then 60 g. of δ-diethylaminobutyl chloride hydrochloride added in small portions to the rapidly stirred mixture. After the addition has been completed 10 g. of sodium hydroxide in a small amount of water is added and the mixture stirred overnight. Most of the alcohol is removed by distillation in vacuo, the residue diluted with water and extracted with ether. The ether extract is extracted with two portions of dilute hydrochloric acid, the extracts made alkaline and extracted with ether. The ether extracts are dried and the ether solution of the free base treated with an excess of dry gaseous hydrogen chloride to obtain the hydrochloride salt of the desired δ-diethylaminobutyl benzhydryl thioether. This salt can be purified by recrystallization from isopropanol-ether mixture.

Example 10.—γ-1-Piperidyl-β,β-dimethylpropyl benzhydryl thioether

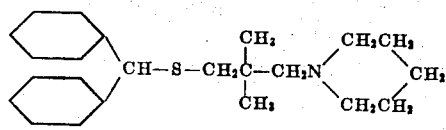

20 g. of benzhydryl mercaptan is dissolved in 200 cc. of 50% methanol containing 8 g. of sodium hydroxide and the resulting solution treated with 22.6 g. of γ-1-piperidyl-β,β-dimethylpropyl chloride hydrochloride. The mixture is heated under reflux for three hours, most of the methanol removed by distillation in vacuo and the solution, after cooling, extracted with ether. The ether extract is extracted with 5% sodium hydroxide, washed with water and then extracted with dilute hydrochloric acid. The acidic extracts are made alkaline in the cold with 10% sodium hydroxide solution, the free base extracted with ether and the ether extracts dried. The dry ether solution is treated with an excess of dry hydrogen chloride and the hydrochloride of the desired γ-1-piperidyl-β,β-dimethylpropyl benzhydryl ether which separates, collected and purified by crystallization from isopropanol-ether mixture.

Example 11.—δ-Isopropylaminobutyl-3-methoxy benzhydryl thioether

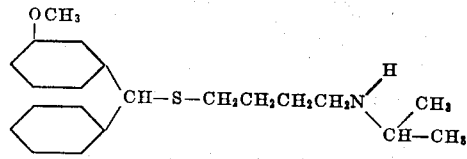

46 g. of 3-methoxy benzhydryl mercaptan is dissolved in 250 cc. of 50% methanol containing 16.5 g. of sodium hydroxide. 37.5 g. of δ-isopropylaminobutyl chloride hydrochloride is added in small portions with stirring and the mixture warmed on a steam bath for two hours. Most of the methanol is removed by distillation in vacuo, the residue diluted with water and extracted with ether. The ether extracts are washed with water, dried and treated with an excess of dry hydrogen bromide. The hydrobromide salt of the desired δ-isopropylaminobutyl-3-methoxybenzhydryl thioether which separates is collected and crystallized from isopropanol-ligroin mixture.

Example 12.—β-4-morpholinylethyl benzhydryl thioether

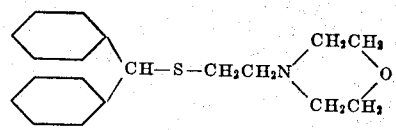

40 g. of sodium hydroxide in 70 cc. of water is added to a solution of 97 g. of S-benzhydrylisothiourea hydrobromide in 250 cc. of 95% ethanol. A yellow color develops and the odor of benzhydryl mercaptan is immediately apparent. The mixture is heated for forty-five minutes and then 55.8 g. of β-morpholinoethyl chloride hydrochloride added over a period of twenty minutes. Considerable heat is generated during the addition and the solution becomes cloudy. After the addition is complete, 10 g. of sodium hydroxide in 15 cc. of water is added, the mixture stirred for two hours and allowed to stand overnight. Most of the alcohol is removed under reduced pressure, the residue diluted with water and extracted with ether. The ether extract is extracted with two portions of dilute hydrochloric acid. On standing, the hydrochloride salt of β-4-morpholinylethyl benzhydryl ether separates from the acidic extracts. The product is collected and purified by recrystallization from isopropanol-ligroin mixture; M. P. 179–80° C.

*Example 13.—β-Diethylaminoethyl benzhydryl thioether*

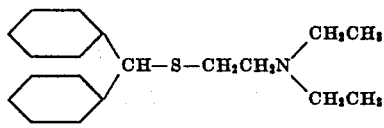

Some further examples of the thioethers which can be prepared by the methods described in detail above are:

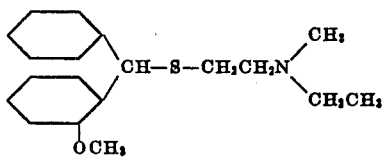

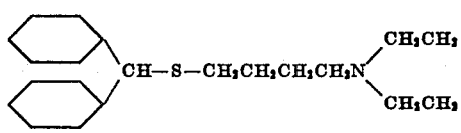

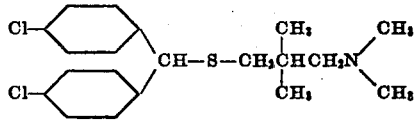

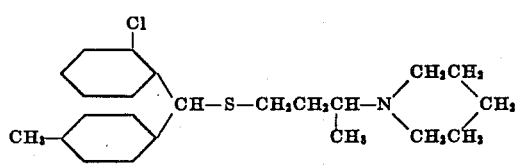

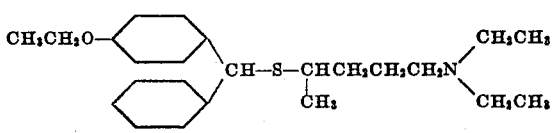

In its broader aspects the invention includes the quaternary ammonium, as well as the acid addition, salts of the free bases of the new thioethers. These quaternary ammonium salts are prepared by reacting an alkyl or aralkyl halide, a dialkyl sulfate or aralkyl aryl sulfonate with the free base of the thioethers. For example, β-benzhydrylthioethyl trimethyl ammonium iodide, the methiodide of the compound of Example 1, is prepared as follows: 10 g. of the hydrochloride salt of β-dimethylaminoethyl benzhydryl thioether is dissolved in water, the solution made alkaline with sodium hydroxide solution, extracted with ether and the ether solution of the free base dried. 1 mol of methyl iodide is added to the ether solution with stirring and the mixture allowed to stand for about 10 hours. The desired quaternary ammonium salt which separates from the ether solution as a white solid, is collected, washed with ether and, if desired, purified by recrystallization from isopropanol.

The mercaptans used as starting materials may be obtained in a number of different ways. Perhaps the most convenient method of preparation consists in generating the mercaptan salt in the reaction mixture solution by treatment of the corresponding S-substituted isothiourea hydrohalide with alkali. The S-benzhydryl isothiourea hydrohalides may be obtained by heating a benzhydryl halide with thiourea in alcohol. The S-(ω-aminoalkyl) isothiourea hydrohalides may be obtained in a similar manner by reacting an ω-aminoalkyl halide or a hydrohalide salt thereof with thiourea in alcohol. The use of these S-substituted isothiourea hydrohalides as intermediates in the preparation of the mercaptan salts is illustrated more fully in Examples 1, 6, 8, 9 and 12.

What I claim as my invention is:

1. A compound of the class consisting of a free base, its quaternary ammonium salts and its acid addition salts, said free base having the formula,

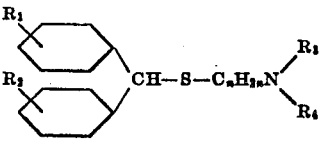

where $n$ is an integer of 2 to 6 inclusive, $R_1$ and $R_2$ are members of the class consisting of hydrogen, halogen, lower alkyl and lower alkoxy, $R_3$ is an alkyl radical containing not more than six carbon atoms and $R_4$ is a member of the class consisting of hydrogen, alkyl radicals containing not more than six carbon atoms and further members wherein $R_3$ and $R_4$ taken with —N< form a saturated heterocycle.

2. A compound of the class consisting of a free base, its quaternary ammonium salts and its acid addition salts, said free base having the formula,

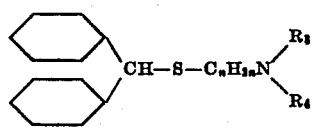

where $n$ is an integer of 2 to 6 inclusive, $R_3$ is an alkyl radical containing not more than six carbon atoms and $R_4$ is a member of the class consisting of hydrogen, alkyl radicals containing not more than six carbon atoms and further members wherein $R_3$ and $R_4$ taken with —N< form a saturated heterocycle.

3. A compound of the class consisting of a free base, its quaternary ammonium salts and its acid addition salts, said free base having the formula,

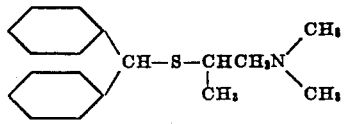

4. A compound of the class consisting of a free base, its quaternary ammonium salts and its acid addition salts, said free base having the formula,

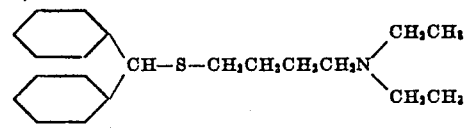

5. A compound of the class consisting of a free base, its quaternary ammonium salts and its acid addition salts, said free base having the formula,

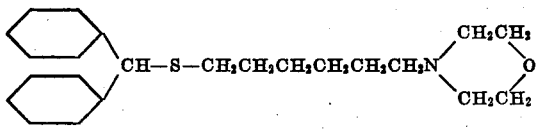

6. A compound of the formula,

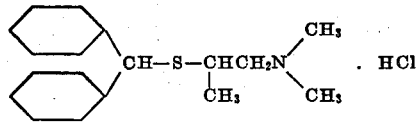

7. A compound of the formula,

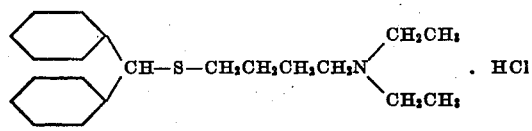

8. A compound of the formula,

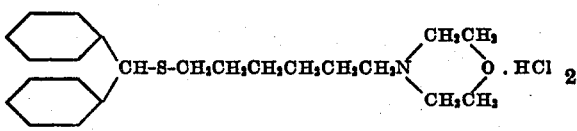

9. Process for obtaining a compound of the formula,

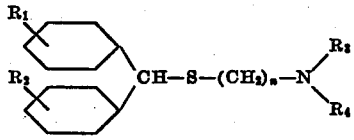

which comprises reacting a compound of the formula,

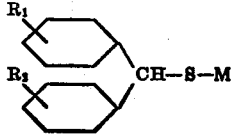

with an ω-aminoalkyl halide of the formla,

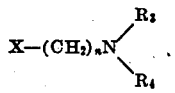

where $n$ is one of the integers 2 to 6, $R_1$ and $R_2$ are members of the class consisting of hydrogen, halogen, lower alkyl, and lower alkoxy, $R_3$ is an alkyl radical containing not more than 6 carbon atoms and $R_4$ is a member of the class cosisting of hydrogen, alkyl radicals containing not more than 6 carbon atoms and further members wherein $R_3$ and $R_4$ taken with —N form a saturated heterocycle, M is an alkali metal and X is a member of the class consisting of chlorine, bromine and iodine.

10. A compound of the class consisting of a free base, its quaternary ammonium salts and its acid addition salts, said free base having the formula,

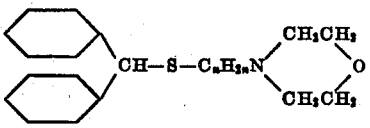

where $n$ is an integer of 2 to 6 inclusive.

GEORGE RIEVESCHL, JR.

REFERENCES CITED

The following references are of record in the file of this patent:

UNITED STATES PATENTS

| Number | Name | Date |
|---|---|---|
| 2,390,555 | Richardson | Dec. 11, 1945 |
| 2,395,336 | MacMullen et al. | Feb. 19, 1946 |
| 2,454,092 | Rieveschl | Nov. 16, 1948 |

OTHER REFERENCES

Karrer, Organic Chemistry, Nordeman Pub. Co. Inc., N. Y. (1938), pages 103, 104 and 109.